(12) United States Patent
Sakai et al.

(10) Patent No.: US 10,616,371 B2
(45) Date of Patent: Apr. 7, 2020

(54) INFORMATION TERMINAL, ACCESS SYSTEM, INFORMATION PROCESSING METHOD, AND PROGRAM

(71) Applicant: NEC Corporation, Tokyo (JP)

(72) Inventors: Tsuyoshi Sakai, Tokyo (JP); Kazuo Hirose, Tokyo (JP); Naoaki Sugio, Tokyo (JP)

(73) Assignee: NEC Corporation, Tokyo (JP)

( * ) Notice: Subject to any disclaimer, the term of this patent is extended or adjusted under 35 U.S.C. 154(b) by 297 days.

(21) Appl. No.: 14/780,910

(22) PCT Filed: Mar. 25, 2014

(86) PCT No.: PCT/JP2014/058214
§ 371 (c)(1),
(2) Date: Sep. 28, 2015

(87) PCT Pub. No.: WO2014/162920
PCT Pub. Date: Oct. 9, 2014

(65) Prior Publication Data
US 2016/0057250 A1    Feb. 25, 2016

(30) Foreign Application Priority Data

Apr. 1, 2013    (JP) ................................. 2013-075684

(51) Int. Cl.
*G06F 15/16*    (2006.01)
*H04L 29/08*    (2006.01)
(Continued)

(52) U.S. Cl.
CPC ........... *H04L 67/325* (2013.01); *G06Q 10/10* (2013.01); *G06Q 10/101* (2013.01); *H04L 67/10* (2013.01); *G06Q 50/01* (2013.01)

(58) Field of Classification Search
CPC ................ H04L 65/403; H04L 67/306; H04L 29/12896; H04L 51/20; H04L 67/104;
(Continued)

(56) References Cited

U.S. PATENT DOCUMENTS 8,352,183 B2 *    1/2013    Thota ................... G06Q 10/107
340/995.14
2005/0227678 A1 *    10/2005    Agrawal ................. H04L 51/12
455/414.3
(Continued)

FOREIGN PATENT DOCUMENTS

CN    102638586 A    8/2012
JP    2006-4318    1/2006
(Continued)

OTHER PUBLICATIONS

International Search Report dated Jun. 17, 2014 in corresponding PCT International Application.
(Continued)

*Primary Examiner* — Dustin Nguyen
(74) *Attorney, Agent, or Firm* — Finnegan, Henderson, Farabow, Garrett & Dunner, L.L.P.

(57) ABSTRACT

An information terminal includes an acquisition unit that acquires specific posted information from a server which collects posted information that is posted from information terminals; a control unit that controls the posted information based on time series information; and a detection unit that detects a predetermined setting operation. When the detection unit detects the setting operation, the control unit executes a sharing process based on information about another information terminal obtained from the server, where the sharing process acquires at least part of data provided by said other information terminal based on the time series information.

13 Claims, 4 Drawing Sheets

(51) Int. Cl.
*G06Q 10/10* (2012.01)
*G06Q 50/00* (2012.01)

(58) Field of Classification Search
CPC ......... H04L 51/12; H04L 67/10; G06Q 10/10; G06Q 10/107; G06Q 30/02; G06Q 50/01; G06F 3/0481; G06F 1/1613; H04W 4/14; H04W 4/21
See application file for complete search history.

(56) References Cited

U.S. PATENT DOCUMENTS

| | | | | |
|---|---|---|---|---|
| 2009/0254840 | A1* | 10/2009 | Churchill | G06F 3/0481 715/753 |
| 2010/0017759 | A1* | 1/2010 | Birnbaum | G06F 1/1613 715/863 |
| 2010/0315433 | A1 | 12/2010 | Takeshita | |
| 2010/0321312 | A1 | 12/2010 | Han et al. | |
| 2011/0004519 | A1* | 1/2011 | Aleong | G06Q 10/10 705/14.53 |
| 2011/0076941 | A1* | 3/2011 | Taveau | G06Q 10/10 455/41.1 |
| 2012/0089689 | A1* | 4/2012 | Tan | H04L 65/403 709/206 |
| 2012/0221962 | A1* | 8/2012 | Lew | H04L 29/12896 715/752 |
| 2012/0266081 | A1 | 10/2012 | Kao | |
| 2012/0270578 | A1* | 10/2012 | Feghali | H04W 4/14 455/466 |
| 2013/0031487 | A1* | 1/2013 | Olsen | G06Q 50/01 715/751 |
| 2013/0054357 | A1* | 2/2013 | Mager | G06Q 30/02 705/14.49 |
| 2013/0066963 | A1 | 3/2013 | Odio et al. | |
| 2013/0073995 | A1 | 3/2013 | Piantino et al. | |
| 2013/0325957 | A1* | 12/2013 | Mizuki | H04L 67/104 709/204 |
| 2014/0032672 | A1* | 1/2014 | Yoshikawa | H04W 4/21 709/204 |
| 2014/0122612 | A1* | 5/2014 | Wu | H04L 51/20 709/205 |
| 2014/0164519 | A1* | 6/2014 | Shah | H04L 67/306 709/204 |
| 2014/0324938 | A1* | 10/2014 | Gardenfors | H04L 67/10 709/201 |

FOREIGN PATENT DOCUMENTS

| | | |
|---|---|---|
| JP | 2008-146246 | 6/2008 |
| JP | 2010-130539 | 6/2010 |
| JP | 2010-267065 | 11/2010 |
| JP | 2010-287059 | 12/2010 |
| JP | 4882686 | 12/2011 |
| JP | 2012-212196 | 11/2012 |
| JP | 2012-530321 | 11/2012 |
| JP | 2012-247840 | 12/2012 |
| JP | 5130409 | 1/2013 |
| JP | 2013-25777 | 2/2013 |
| WO | WO 2010/147828 A1 | 12/2010 |
| WO | WO 2012/154169 A1 | 11/2012 |
| WO | WO 2012/161435 A2 | 11/2012 |

OTHER PUBLICATIONS

First Office Action issued by The State Intellectual Property Office of the People's Republic of China Patent Office in counterpart Chinese Patent Application No. 201480018859.3, dated Apr. 5, 2017.

Notification of Reasons for Refusal dated Nov. 7, 2017, by Japanese Patent Office in counterpart Japanese Patent Application No. 2015-510013.

Decision to Grant a Patent dated May 15, 2018, issued by the Japanese Patent Office in counterpart Japanese Patent Application No. 2015-510013.

Office Action dated Aug. 22, 2019, issued by the European Patent Office in counterpart European Patent Application No. 14 778 946.5.

* cited by examiner

INFORMATION TERMINAL, ACCESS SYSTEM, INFORMATION PROCESSING METHOD, AND PROGRAM

CROSS-REFERENCE TO RELATED PATENT APPLICATIONS

This application is a National Stage Entry of International Application No. PCT/JP2014/058214, filed Mar. 25, 2014, which claims priority from Japanese Patent Application No. 2013-075684, filed Apr. 1, 2013. The entire contents of the above-referenced applications are expressly incorporated herein by reference.

TECHNICAL FIELD

The present invention relates to an information terminal, an access system, an information processing method, and a relevant program.

BACKGROUND ART

In recent years, owing to the development of social networking services (SNS) that utilize the Internet, more people enjoy communication with their friends or people who have common interests or the like.

Various technologies related to such circumstances are known (e.g., see Patent Document 1).

For example, Patent Document 1 discloses a social networking system having a server and user devices which are connectable to each other via a network, where the system provides communication services among users for which a friend relationship or a close-friend relationship has been set.

More specifically, the server stores (i) multimedia data for each user in a storage area which is provided for said each user who utilizes a user device and (ii) relationship information indicating that a close-friend relationship has been set among specific users within a predetermined number of people, which is defined for personal use.

Each user device issues a request to access the multimedia data stored in the server. When the access request is sent from the user device, the server permits the user device to access (i) the multimedia data stored in the storage area of the user who uses the user device and (ii) the multimedia data stored in the storage area of each user, where the close-friend relationship has been set between this user and the user of the current user device.

Thus, according to the above social networking system, it is possible to legally share media files for personal use.

In addition, there is a technique to disclose data only to members that have been registered.

Various technologies related to such circumstances are known (e.g., see Patent Document 2).

For example, Patent Document 2 discloses a server which applies access restriction to a device of each member whose level has been set by a level setting unit, so as to disclose data corresponding to the set level.

More specifically, for each data item to be disclosed via an SNS, the server assigns a disclosure level to the data so as to perform the access restriction for the members having individual levels. Therefore, in this server, in order to disclose a posted message among only specifically limited members, a high disclosure level is assigned to the message. In contrast, in order to unlimitedly disclose the message, a low disclosure level is assigned to the message. Accordingly, the relevant server can control the access restriction.

Additionally, there is a technique to share information (e.g., album information) within each group.

Various technologies related to such circumstances are known (e.g., see Patent Document 3).

For example, Patent Document 3 discloses a method in which individual terminal apparatuses are registered as one group and a shared album for the group is browsed and edited within the relevant group.

More specifically, each terminal apparatus has a radio communication unit which performs radio communication with any nearby external terminal apparatus. The terminal apparatus also has a group identification information generating device that generates group identification information utilized to identify the external terminal apparatus and the own apparatus, which communicate with each other via the radio communication unit, as a group of the terminal apparatuses.

The disclosed terminal apparatus further includes a content data providing device that provides to a plurality of terminal apparatuses identified by the group identification information, content data associated with the group identification information. The terminal apparatus also includes a transmission control device that transmits the group identification information, which is generated by the group identification information generating device, to the content data providing device.

Accordingly, the disclosed terminal apparatus can group a plurality of terminal apparatuses by a simple operation while enhancing the security thereof, where content data can be shared among the grouped terminal apparatuses.

Furthermore, there is a technique to modify a content sharing method within a social network.

Various technologies related to such circumstances are known (e.g., see Patent Document 4).

For example, Patent Document 4 discloses a social network service that can modify a method of sharing contents within a social network so as to include a designated privacy setting in the contents.

More specifically, in the social network service, each user apparatus includes any device that enables interchange among the relevant user and other users of the social network service.

The user apparatus performs data communication via a web server. In addition, the user apparatus can request a web page that includes contents and is transmitted from the web server.

Additionally, the user can post content to the social network service via the user apparatus by uploading the content while accessing the relevant web page. A user profile storage unit communicates with the web server so that each user of the social network service can access a user profile object. According to the user profile object, each user of the social network service can access grouped data that can be used to automatically generate a group of communicating members.

According to the above social network service, accessibility of each uploaded content posted by the user can be handled by utilizing the privacy setting. Therefore, a large flexibility can be applied to determination to permit someone to view the relevant content.

PRIOR ART DOCUMENT

Patent Document

Patent Document 1: Publication of Japanese Patent No. 4882686.
Patent Document 2: Japanese Unexamined Patent Application, First Publication No. 2008-146246

Patent Document 3: Japanese Unexamined Patent Application, First Publication No. 2010-130539.

Patent Document 4: Published Japanese Translation, No. 2012-530321, of PCT International Publication

DISCLOSURE OF INVENTION

Problem to be Solved by the Invention

However, any technique disclosed in Patent Documents 1 to 4 cannot make data to be shared in a community service be simply and explicitly shared.

An object of the present invention is to provide an information terminal, an access system, an information processing method, and a relevant program, which solve the above-described problem.

Means for Solving the Problem

In order to solve the above problem, the present invention provides an information terminal comprising:

an acquisition unit that acquires specific posted information from a server which collects posted information that is posted from information terminals;

a control unit that controls the posted information based on time series information; and a detection unit that detects a predetermined setting operation, wherein when the detection unit detects the setting operation, the control unit executes a sharing process based on information about another information terminal obtained from the server, where the sharing process acquires at least part of data provided by said other information terminal based on the time series information.

The present invention also provides an access system comprising:

a first information terminal;

a second information terminal; and a community service apparatus wherein when a setting for sharing data between the first information terminal and the second information terminal is executed in response to a common action performed by both information terminals so as to share data, the data sharing is executed by displaying posted data from one of the information terminals, between which the setting for sharing data is effective, or a link to the posted data, on a time line of the other information terminal.

The present invention also provides an information processing method comprising:

an acquisition step that acquires specific posted information from a server which collects posted information that is posted from information terminals;

a control step that controls the posted information based on time series information; and a detection step that detects a predetermined setting operation, wherein when the detection step detects the setting operation, the control step executes a sharing process based on information about another information terminal obtained from the server, where the sharing process acquires at least part of data provided by said other information terminal based on the time series information.

The present invention also provides a program that makes a computer function as:

an acquisition unit that acquires specific posted information from a server which collects posted information that is posted from information terminals;

a control unit that controls the posted information based on time series information; and a detection unit that detects a predetermined setting operation, wherein when the detection unit detects the setting operation, the control unit executes a sharing process based on information about another information terminal obtained from the server, where the sharing process acquires at least part of data provided by said other information terminal based on the time series information.

The above disclosure of the invention does not include all features according to the present invention. Additionally, a sub-combination among the features also functions as the present invention.

Effect of the Invention

As understood by the above explanation, in accordance with the present invention, it is possible to simply and explicitly share data for a community service.

MODE FOR CARRYING OUT THE INVENTION

Below, the present invention will be explained in accordance with embodiments thereof. The following embodiments do not limit the invention decided in the claims, and all combinations of features described in the embodiments are not always essential as the means for solving the relevant problem.

Figure 1:
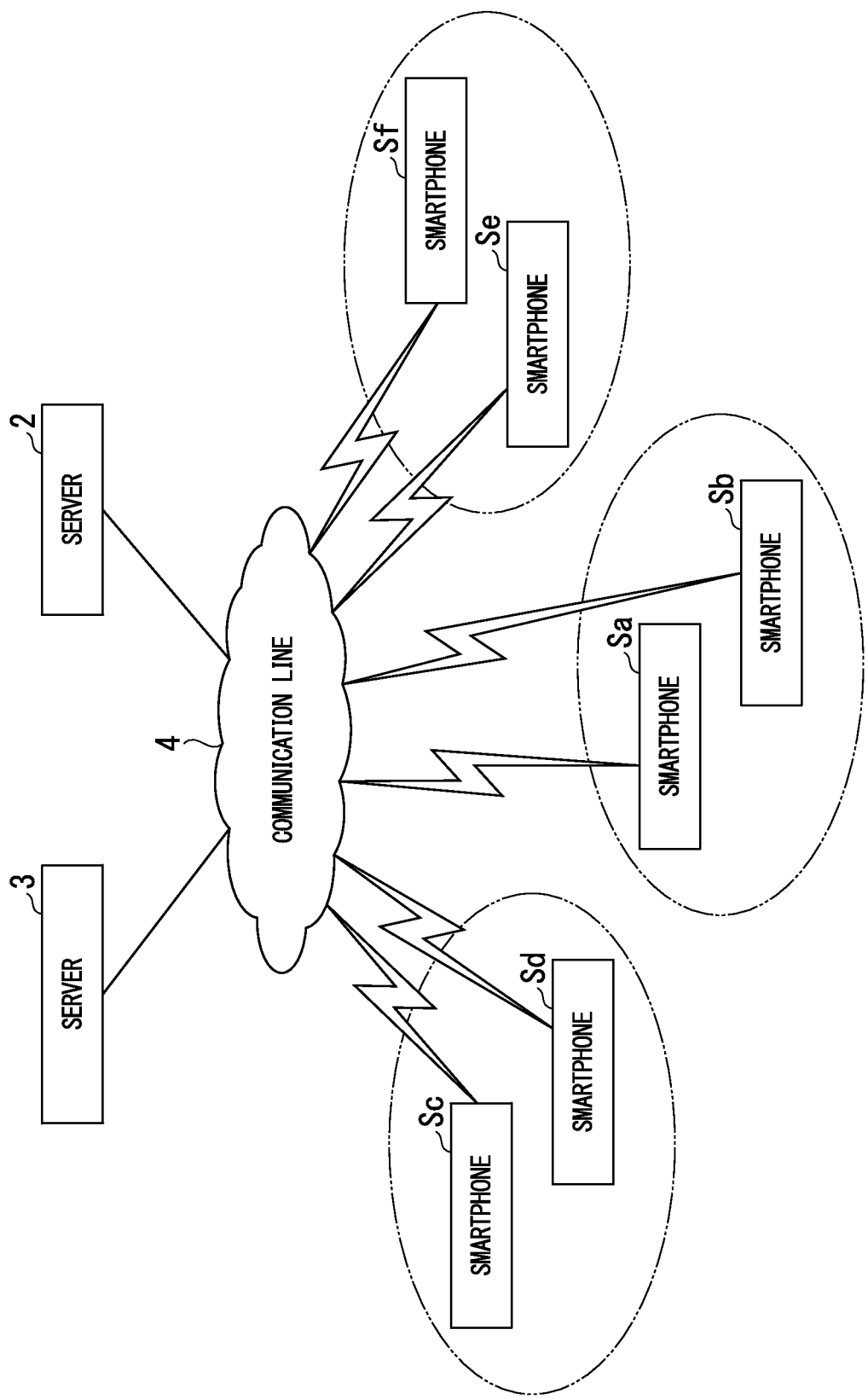
FIG. 1 is a diagram showing an example of the block configuration of an access system as an embodiment of the present invention.

FIG. 1 shows an example of the block configuration of an access system 100 as an embodiment.

The access system 100 includes a first smartphone Sa, a second smartphone Sb, and a server 2 as a community service apparatus pertaining to the present invention.

The access system 100 also includes a server 3. The first smartphone Sa, the second smartphone Sb, and other smartphones Sc, Sd, Se, and Sf are connected to the servers 2 and 3 through a communication line 4.

In the present embodiment, the first smartphone Sa and the second smartphone Sb, the smartphones Sc and Sd, and the smartphones Se and Sf are each handled as a group.

When the smartphones Sa and Sb perform a common action (i.e., setting operation) to share data, the server 2 performs setting for sharing data from the smartphones Sa and Sb. Then the server 2 performs data sharing by displaying on a time-line of the first smartphone Sa (for which the data sharing is effective), posted data or a link to the posted data of the second smartphone Sb. In addition, after the server 2 performs the setting for sharing data, the server 2 releases the data sharing setting when a predetermined condition is satisfied.

In the data sharing setting of the server 2, if the common action is a predetermined action, the smartphones Sa and Sb may apply a predetermined restriction to the partner of the sharing. Additionally, in the data sharing setting of the server 2, if the common action is a predetermined action, the smartphones Sa and Sb may set a one-way sharing.

In addition, in the data sharing setting of the server 2, the smartphones Sa and Sb may limit data to be shared. Furthermore, in the data sharing setting of the server 2, the smartphones Sa and Sb may share previous data before the common action is performed.

That is, a shared state corresponding to any condition can be implemented by predetermining a setting action corresponding to a desired condition.

Furthermore, when the smartphones Sa and Sb post data to the server 2, the smartphones Sa and Sb each may add to the posted data, information (e.g., location information) which indicates that the users of the smartphones, who performed the common action, are together with each other.

Figure 2:
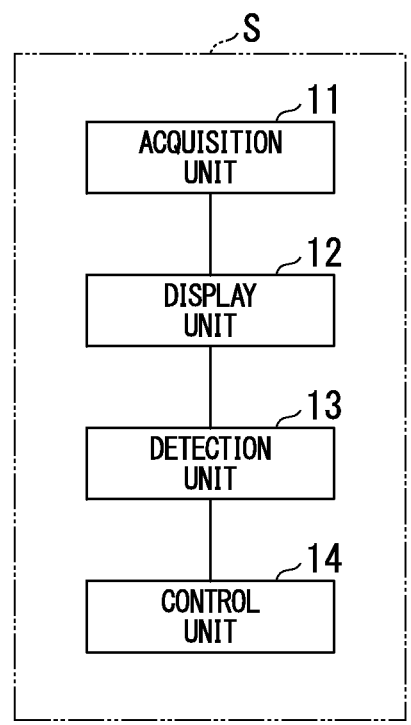
FIG. 2 is a diagram showing an example of the block configuration of each smart phone "S".

FIG. 2 shows an example of the block configuration of each smart phone (called "S"). Here, the smartphones S may function as the information terminal, the first information terminal, or the second information terminal of the present invention.

The smartphone S includes an acquisition unit 11, a display unit 12, a detection unit 13, and a control unit 14.

The acquisition unit 11 acquires specific posted information from the server 2 which collects posted information that is posted from other smartphones S.

The display unit 12 displays the acquired posted information.

The detection unit 13 detects a predetermined setting operation.

The control unit 14 controls the posted information based on time series information.

When the detection unit 13 detects the predetermined setting operation, the control unit 14 executes a data sharing process based on information about another smartphone S, which is obtained from the server 3. In the data sharing process, at least part of the data acquired by the other smartphone S is acquired based on the time series information.

In addition, when the predetermined setting operation is detected, the control unit 14 obtains the information about the other smartphone S from the server 3. In this process, the information about the other smartphone S, which is extracted by the server 3, may be obtained based on the location information of the own terminal.

Additionally, the control unit 14 acquires the posted information for a given period of time determined based on the predetermined setting operation.

Figure 3:
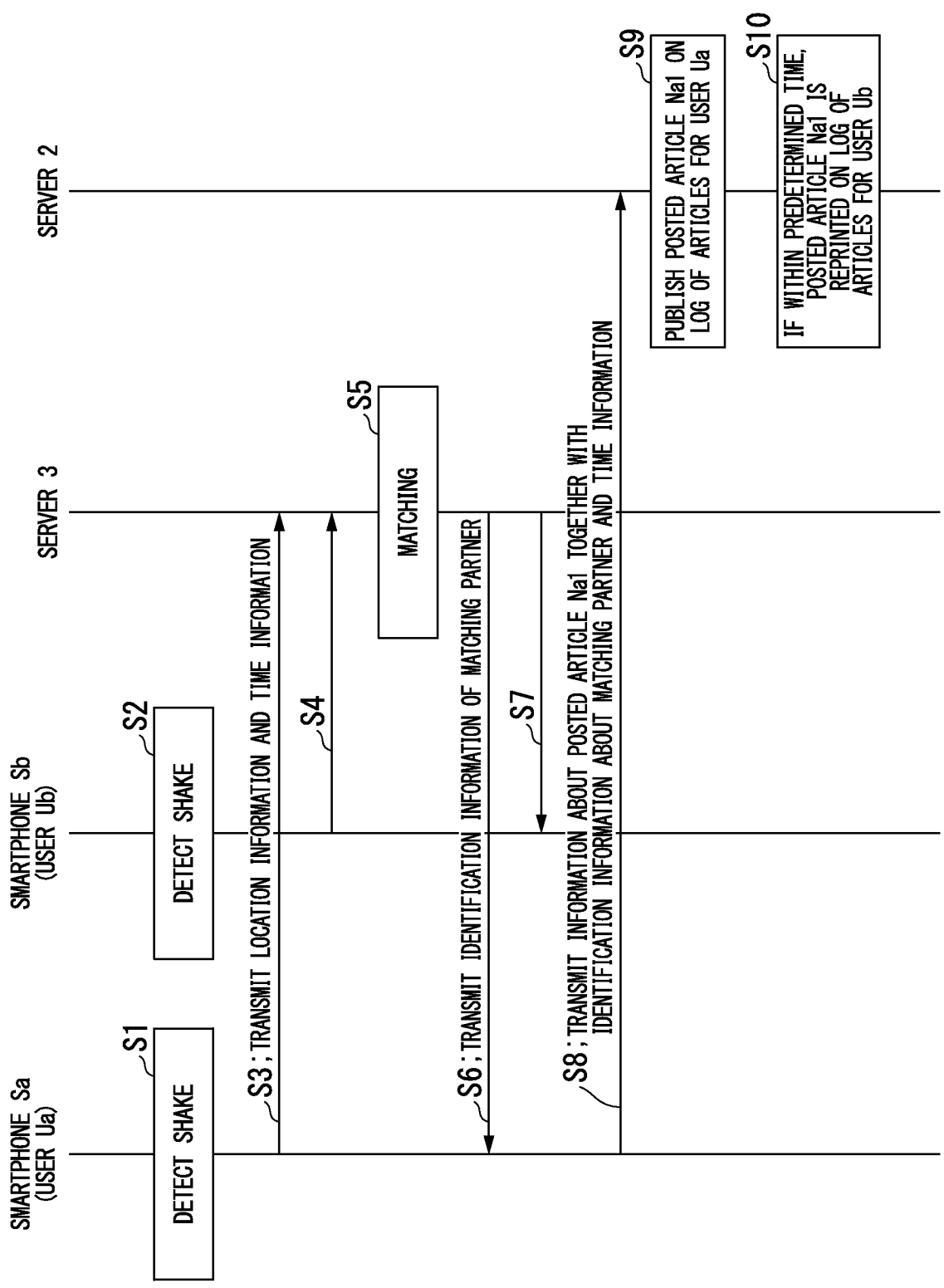
FIG. 3 is a sequence diagram in the case of posting information after performing a setting operation in the access system.
Figure 4:
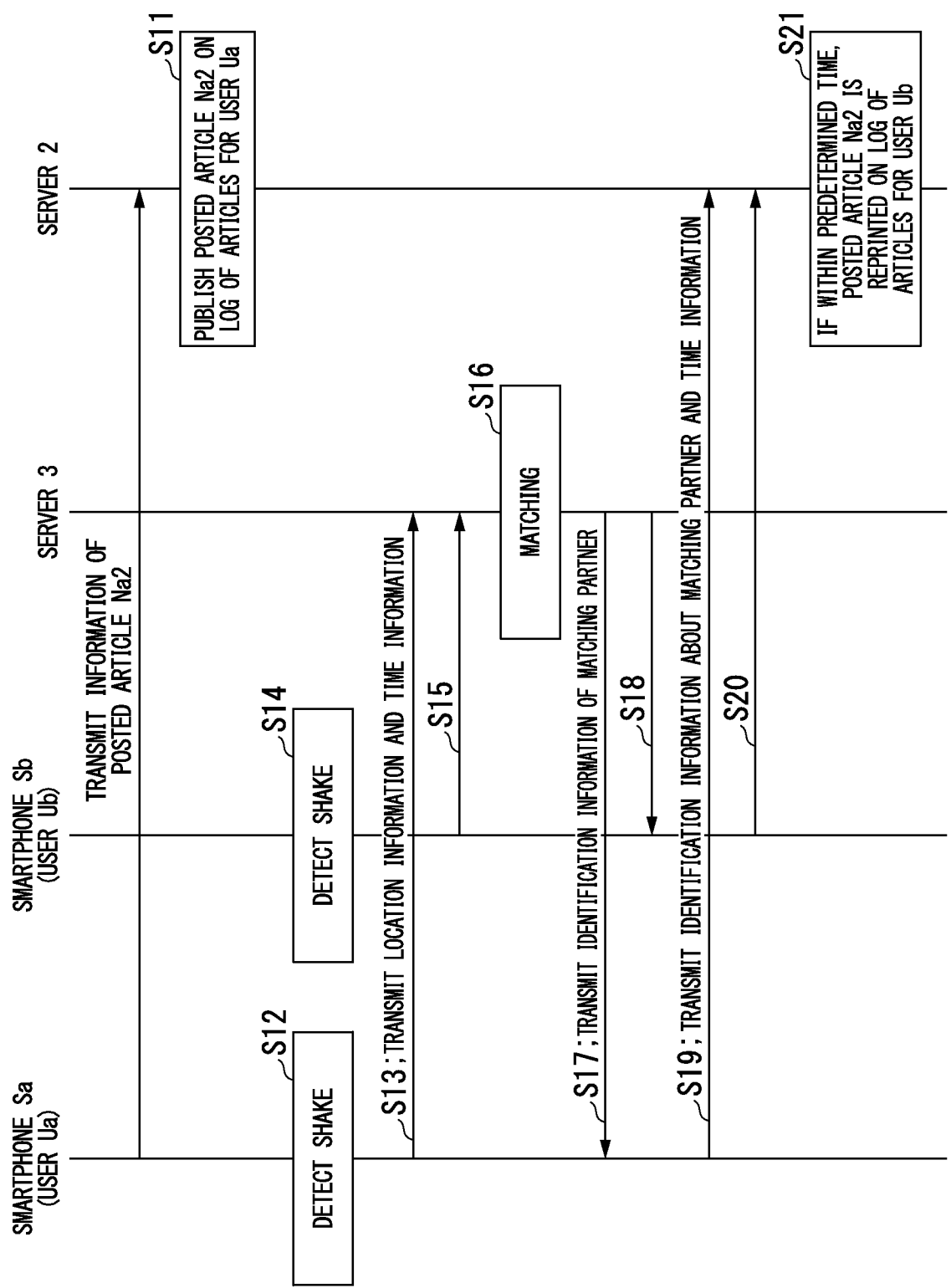
FIG. 4 is a sequence diagram in the case of performing a setting operation after information is posted in the access system.

FIG. 3 is a sequence diagram in the case of posting information after performing the predetermined setting operation in the access system 100. FIG. 4 is a sequence diagram in the case of performing the predetermined setting operation after information is posted in the access system 100.

As shown in FIG. 3, a case in which the user Ua of the first smartphone Sa shares a posted article Na1 with the user Ub of the second smartphone Sb will be explained.

This case requires a condition such that each of the users Ua and Ub has acquired in advance, an application software utilized for the data sharing. Therefore, the relevant users Ua and Ub each tap on the display screen of the corresponding smartphones Sa and Sb, an item "Contact" and then an item "Myself" in advance, so as to confirm the relevant item of the personal information.

First, the user Ua of the first smartphone Sa and the user Ub of the second smartphone Sb each perform a "shake" (smartphone shaking operation) as the common action (i.e., the setting operation).

When the first smartphone Sa detects the shake (see step S1), the first smartphone Sa transmits to the server 3, location information obtained by a GPS or the like and time information about a time when the shake was performed (see step S3). Similarly, when the second smartphone Sb detects the shake (see step S2), the second smartphone Sb transmits to the server 3, location information obtained by a GPS or the like and time information about a time when the shake was performed (see step S4). The shake detection by the individual smartphones Sa and Sb is performed by utilizing an acceleration sensor or the like built in the relevant smartphone (Sa or Sb).

The server 3 compares the location information and the time information from the first smartphone Sa with the location information and the time information from the second smartphone Sb (see step S5).

If the server 3 confirms that the compared information items match with each other, the server 3 transmits to the first smartphone Sa, identification information of the matching partner (here, the second smartphone Sb) (see step S6). Similarly, the server 3 transmits to the second smartphone Sb, identification information of the matching partner (here, the first smartphone Sa) (see step S7).

Then the first smartphone Sa transmits to the server 2, information about the posted article Na1 together with the identification information about the matching partner and the time information (see step S8).

The server 2 publishes the posted article Na1 on a log of articles for the user Ua (see step S9).

Then, if it is within a predetermined time, the server 2 reprints the posted article Na1 (i.e., one or more articles which are sequentially posted by the User Ua) on a log of articles for the user Ub (see step S10).

Here, the predetermined time within which the server 2 reprints the posted article Na1 on the log of articles for the user Ub may be from the time when the shared state is automatically started (e.g., a moment indicated by the time information received in step S8) to any one of (i) a few minutes later, (ii) a time when both users perform the "shake" (i.e., shakes the smartphone) again, (iii) a time when a predetermined number of data items (or articles) is shared (or reprinted), (iv) a time when the relevant user leaves the current location (by a predetermined distance or greater), and (v) both users become apart from each other.

In the above-mentioned cases (ii), (iv), and (v), information required for the relevant determination (i.e., detection information of an action, location information, or the like) is appropriately provided to the server 2.

Next, as shown in FIG. 4, a case in which after a posted article Na2 is published on the log of articles of the user Ua of the first smartphone Sa, this article is shared with the user Ub of the second smartphone Sb will be explained.

The server 2 publishes information of the posted article Na2 which is posted from the user Ua of the first smartphone Sa (see step S11).

Next, the user Ua of the first smartphone Sa and the user Ub of the second smartphone Sb each perform a shake as the common action.

When the first smartphone Sa detects the shake (see step S12), the first smartphone Sa transmits to the server 3, location information and time information about a time when the shake was performed (see step S13). Similarly, when the second smartphone Sb detects the shake (see step S14), the second smartphone Sb transmits to the server 3, location information and time information about a time when the shake was performed (see step S15).

The server 3 compares the location information and the time information from the first smartphone Sa with the location information and the time information from the second smartphone Sb (see step S16).

If the server 3 confirms a matching state between the relevant information items, the server 3 transmits identification information of the matching partner to the first smartphone Sa (see step S17). Similarly, the server 3 transmits identification information of the matching partner to the second smartphone Sb (see step S18).

Then the first smartphone Sa transmits to the server 2, the identification information about the matching partner and the time information (see step S19). Similarly, the second smartphone Sb transmits to the server 2, the identification information about the matching partner and the time information (see step S20).

Then, if the article Na2 (i.e., one or more articles which are sequentially posted by the User Ua) was posted within a predetermined time measured back to the past from the current time, the server 2 reprints the posted article Na2 on a log of articles for the user Ub (see step S21).

More specifically, the reprinted article may be (i) an article within a predetermined time measured back to the past from the publishing of a most recent article, (ii) an article posted within a past few minutes, (iii) an article within a predetermined time measured back to the past from the time when the relevant user came to the current location, or (iv) an article within a predetermined time measured back to the past from the time when both users met each other.

As described above, according to the first smartphone Sa of the present embodiment, when the detection unit 13 detects a predetermined setting operation, the control unit 14 executes, based on information about another information terminal (i.e., the second smartphone Sb) obtained from the server 3, a data sharing process to acquire at least part of the data provided by the second smartphone Sb based on relevant time-series information. Therefore, according to the first smartphone Sa, the control unit 14 can make data (to be shared) be easily and explicitly shared on the community service.

Additionally, according to the first smartphone Sa of the present embodiment, when the control unit 14 detects a predetermined setting operation, the control unit 14 can acquire information about another information terminal (i.e., the second smartphone Sb) from the server 3.

Also, according to the first smartphone Sa of the present embodiment, when the control unit 14 detects a predetermined setting operation, the control unit 14 can acquire information about another information terminal (i.e., the second smartphone Sb) extracted by the server 3, based on location information about the first smartphone Sa.

Again according to the first smartphone Sa of the present embodiment, the control unit 14 can share posted information with another information terminal within a fixed time based on a predetermined setting operation.

According to the access system 100 of the present embodiment, when the server 2 performs the setting for sharing data from the smartphones Sa and Sb in response to the common action performed by the smartphones Sa and Sb so as to share data therebetween, the data sharing can be implemented by displaying by the server 2, (i) posted data by the second smartphone Sb or a link to the posted data on a time line of the first smartphone Sa (for which the data sharing is being set) or (ii) posted data by the first smartphone Sa or a link to the posted data on a time line of the second smartphone Sb.

In addition, according to the access system 100 of the present embodiment, after performing the data sharing setting, the server 2 can apply a restriction to the information disclosure so as to release the data sharing setting when a predetermined condition is satisfied.

Also, according to the access system 100 of the present embodiment, if the common action for the data sharing setting with respect to the server 2 is a predetermined action, the smartphones Sa and Sb can ensure security by applying a restriction to a sharing partner.

Additionally, according to the access system 100 of the present embodiment, if the common action for the data sharing setting with respect to the server 2 is a predetermined action, the smartphones Sa and Sb can set a one-way sharing.

Furthermore, according to the access system 100 of the present embodiment, in the data sharing setting for the server 2, the smartphones Sa and Sb can limit data to be shared.

Again according to the access system 100 of the present embodiment, in the data sharing setting for the server 2, the smartphones Sa and Sb can share previous data before the common action is performed.

Additionally, according to the access system 100 of the present embodiment, when the smartphone Sa posts data to the server 2, the smartphone Sa can add to the posted data, information (e.g., location information) which indicates that the user of the smartphone is with the user of the smartphone Sb who performed the common action (of the smartphones Sa and Sb) together.

In accordance with the information processing method of the present embodiment, it is possible to simply and explicitly share data (to be shared) on a community service.

Furthermore, according to a program utilized to make a computer execute the information processing method of the present embodiment, it is possible to simply and explicitly share data (to be shared) on a community service.

The information terminal, the access system, the information processing method, and the program of the present invention are not limited to those of the above-described embodiment, and it is possible to carry out an appropriate modification, improvement, or the like.

Priority is claimed on Japanese Patent Application No. 2013-075684, filed Apr. 1, 2013, the contents of which are incorporated herein by reference.

INDUSTRIAL APPLICABILITY

In accordance with the present invention, it is possible to simply and explicitly share data for a community service.

REFERENCE SYMBOLS 2 server
11 acquisition unit
12 display unit
13 detection unit
14 control unit
100 access system
Sa first smartphone
Sb second smartphone

The invention claimed is:

1. An information terminal comprising a processor programmed to:
acquire specific posted information from a server which collects posted information that is posted from information terminals;
control the posted information based on time series information; and
detect a predetermined setting operation,
wherein when the processor detects that a user shakes the information terminals as the setting operation, the processor is further programmed to execute a sharing process based on information about another information terminal obtained from the server, where the sharing process acquires at least part of the posted information provided by the another information terminal based on the time series information,
wherein the at least part of the posted information provided by the another information terminal is reprinted on a log of the information terminal in order to share the at least part of the posted information provided by the another information terminal between the another information terminal and the information terminal, and
wherein the at least part of the posted information is shared between the information terminal and the another information terminal during a period starting at a time when the sharing process is started and ending at a time when a predetermined number of data items of the posted information is shared by reprinting on the log of the information terminal.

2. The information terminal in accordance with claim 1, wherein:
when the setting operation is detected, the processor is further programmed to obtain the information about the another information terminal from the server.

3. The information terminal in accordance with claim 1, wherein:
when the setting operation is detected, the processor is further programmed to obtain, based on location information of the own terminal, the information about the another information terminal, which is extracted from the server.

4. The information terminal in accordance with claim 1, wherein:
the processor is further programmed to obtain the posted information within a fixed time based on the setting operation.

5. An access system comprising:
a first information terminal;
a second information terminal; and
a community service apparatus wherein when a setting for sharing data between the first information terminal and the second information terminal is executed in response to a common action performed by both information terminals so as to share data, the data sharing is executed by displaying posted data from one of the information terminals, between which the setting for sharing data is effective, or a link to the posted data, on a time line of the other information terminal,
wherein the common action is to shake the first and second information terminals;
wherein the community service apparatus reprints the posted data from one of the information terminals or the link to the posted data on the time line of the other information terminal so as to share the posted data between the first and second information terminals, and
wherein the community service apparatus shares the posted data between the first and second information terminals during a period starting at a time when the data sharing is started and ending at a time when a predetermined number of data items of the posted data or the link to the posted data is shared by reprinting on the time line of the other information terminal.

6. The access system in accordance with claim 5, wherein:
after the setting for sharing data is executed, the community service apparatus releases the setting for sharing data when a predetermined condition is satisfied.

7. The access system in accordance with claim 5, wherein:
when the community service apparatus executes the setting for sharing data, if the common action is a predetermined action, each information terminal applies a restriction to a sharing partner.

8. The access system in accordance with claim 5, wherein:
when the community service apparatus executes the setting for sharing data, if the common action is a predetermined action, the information terminals set a one-way sharing.

9. The access system in accordance with claim 5, wherein:
when the community service apparatus executes the setting for sharing data, the information terminals limit data to be shared.

10. The access system in accordance with claim 5, wherein:
when the community service apparatus executes the setting for sharing data, the information terminals share previous data before the setting for sharing data is executed.

11. The access system in accordance with claim 5, wherein:
when the data is posted to the community service apparatus, at least one of the information terminals adds to the posted data, information which indicates that a user of the relevant information terminal is with a user of the other information terminal who performed the common action together.

12. An information processing method comprising:
an acquisition step that acquires specific posted information from a server which collects posted information that is posted from information terminals;
a control step that controls the posted information based on time series information; and
a detection step that detects, as a predetermined setting operation, that users shake the information terminals,
wherein when the detection step detects the setting operation, the control step executes a sharing process based on information about another information terminal obtained from the server, where the sharing process acquires at least part of the posted information provided by the another information terminal based on the time series information,
wherein the at least part of the posted information provided by the another information terminal is reprinted on a log of the shaken information terminal in order to share the at least part of the posted information between the another information terminal and the shaken information terminal, and
wherein the at least part of the posted information is shared between the another information terminal and the shaken information terminal during a period starting at a time when the sharing process is started and ending at a time when a predetermined number of data items of the posted information is shared by reprinting on the log of the shaken information terminal.

13. A non-transitory computer-readable storage medium which stores a program that makes a computer function as:
   an acquisition unit that acquires specific posted information from a server which collects posted information that is posted from information terminals;
   a control unit that controls the posted information based on time series information; and
   a detection unit that detects, as a predetermined setting operation, that a user shakes the computer,
   wherein when the detection unit detects the setting operation, the control unit executes a sharing process based on information about another information terminal obtained from the server, where the sharing process acquires at least part of the posted information provided by the another information terminal based on the time series information,
   wherein the at least part of the posted information provided by the another information terminal is reprinted on a log of the computer in order to share the at least part of the posted information between the another information terminal and the computer, and
   wherein the at least part of the posted information is shared between the another information terminal and the computer during a period starting at a time when the sharing process is started and ending at a time when a predetermined number of data items of the posted information is shared by reprinting on the log of the computer.

* * * * *